US009257132B2

(12) United States Patent
Gowreesunker et al.

(10) Patent No.: US 9,257,132 B2
(45) Date of Patent: Feb. 9, 2016

(54) DOMINANT SPEECH EXTRACTION IN THE PRESENCE OF DIFFUSED AND DIRECTIONAL NOISE SOURCES

(71) Applicant: Texas Instruments Incorporated, Dallas, TX (US)

(72) Inventors: Baboo Vikrhamsingh Gowreesunker, San Francisco, CA (US); Nitish Krishna Murthy, Allen, TX (US); Edwin Randolph Cole, Blue Ridge, GA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 29 days.

(21) Appl. No.: 14/320,723

(22) Filed: Jul. 1, 2014

(65) Prior Publication Data

US 2015/0025878 A1 Jan. 22, 2015

Related U.S. Application Data

(60) Provisional application No. 61/846,719, filed on Jul. 16, 2013.

(51) Int. Cl.
*G10L 21/02* (2013.01)
*G10L 15/20* (2006.01)
(Continued)

(52) U.S. Cl.
CPC ............ *G10L 21/0208* (2013.01); *H04R 3/005* (2013.01); *G10L 21/0232* (2013.01); *G10L 2021/02166* (2013.01); *H04R 1/406* (2013.01); *H04R 2410/05* (2013.01); *H04R 2430/03* (2013.01); *H04R 2499/11* (2013.01)

(58) Field of Classification Search
None
See application file for complete search history.

(56) References Cited

U.S. PATENT DOCUMENTS 8,504,117 B2 * 8/2013 Fox .................... G10L 21/0208 381/92
8,812,309 B2 * 8/2014 Ramakrishnan .... G10L 21/0272 381/10
2011/0125497 A1 5/2011 Unno
2013/0054232 A1 2/2013 Unno
(Continued)

OTHER PUBLICATIONS

M. Moonen and S. Doclo, "Digital Audio Signal Processing Lecture-2: Microphone Array Processing", Version 2013-2014, pp. 1-40, available at http://homes.esat.kuleuven.be/~dspuser/dasp/material/Slides_2013_2014/Lecture-2.pdf.
(Continued)

*Primary Examiner* — Satwant Singh
(74) *Attorney, Agent, or Firm* — Gregory J. Albin; Frank D. Cimino

(57) ABSTRACT

A method of dominant speech extraction is provided that includes acquiring a primary audio signal from a microphone and at least one additional audio signal from at least one additional microphone, wherein the acquired audio signals include speech and noise, decomposing each acquired audio signal into a low frequency sub-band signal and a high frequency sub-band signal, applying speech suppression beamforming to the low frequency sub-band signals to generate a reference channel having an estimate of noise in the low frequency sub-band signals, applying noise cancellation to the low frequency sub-band signal of the primary audio signal using the reference channel to generate a first signal having a low frequency estimate of the speech, applying noise suppression beamforming to the high frequency sub-band signals to generate a second signal having a high frequency estimate of the speech, and combining the first and second signals to generate a full-band audio signal.

8 Claims, 2 Drawing Sheets

(51) Int. Cl.

| | |
|---|---|
| ***G10L 21/0208*** | (2013.01) |
| ***H04R 3/00*** | (2006.01) |
| *G10L 21/0216* | (2013.01) |
| *G10L 21/0232* | (2013.01) |
| *H04R 1/40* | (2006.01) |

(56) References Cited

U.S. PATENT DOCUMENTS

| | | | | |
|---|---|---|---|---|
| 2013/0054233 | A1 | 2/2013 | Unno et al. | |
| 2014/0219474 | A1* | 8/2014 | Feldt | H04R 3/005 381/98 |
| 2014/0355775 | A1* | 12/2014 | Appelbaum | H04R 3/002 381/71.1 |

OTHER PUBLICATIONS

S. Doclo and M. Moonen, "Superdirective Beamforming Robust Against Microphone Mismatch", IEEE Transactions on Audio, Speech, and Language Processing, vol. 15, No. 2, Feb. 2002, pp. 617-630.

S. A. Hadei and M. Lotfizad, "A Family of Adaptive Filter Algorithms in Noise Cancellation for Speech Enhancement", International Journal of Computer and Electrical Engineering, vol. 2, No. 2, Apr. 2010, pp. 307-315.

P. P. Vaidyanathan, "Multirate Digital Filters, Filter Banks, Polyphase Networks, and Applications: A Tutorial", Proceedings of the IEEE, vol. 78, No. 1, Jan. 1990, pp. 56-90.

* cited by examiner

DOMINANT SPEECH EXTRACTION IN THE PRESENCE OF DIFFUSED AND DIRECTIONAL NOISE SOURCES

CROSS-REFERENCE TO RELATED APPLICATIONS

This application claims benefit of U.S. Provisional Patent Application Ser. No. 61/846,719, filed Jul. 16, 2013, which is incorporated herein by reference in its entirety.

BACKGROUND OF THE INVENTION

1. Field of the Invention

Embodiments of the present invention generally relate to dominant speech extraction in the presence of diffused and directional noises.

2. Description of the Related Art

Current spatial noise cancellation techniques such as filter-and-sum beamforming and super-directivity beamforming do not intrinsically exploit the spectral nature of audio signals. Such techniques are typically cascaded with traditional single channel noise cancellation to provide a complete solution. Such a solution is sub-optimal because the spatial noise cancellation does not benefit from the traditional noise cancellation, and vice-versa. Furthermore, most such solutions tend to favor either diffuse or directional noise.

SUMMARY

Embodiments of the present invention relate to dominant speech extraction in the presence of diffused and directional noises. In one aspect, a method of dominant speech extraction in a digital system is provided that includes acquiring a primary audio signal from a primary microphone in the digital system and at least one additional audio signal from at least one additional microphone in the digital system, wherein the acquired audio signals include speech and noise, decomposing each of the acquired audio signals into a low frequency sub-band signal and a high frequency sub-band signal, applying speech suppression beamforming to the low frequency sub-band signals to generate a reference channel having an estimate of a level of noise in the low frequency sub-band signals, applying noise cancellation to the low frequency sub-band signal of the primary audio signal using the reference channel to generate a first signal having a low frequency estimate of the speech, applying noise suppression beamforming to the high frequency sub-band signals to generate a second signal having a high frequency estimate of the speech, and combining the first signal and the second signal to generate a full-band audio signal.

In one aspect, a digital system is provided that includes at least one processor, a primary microphone configured to acquire a primary audio signal comprising speech and noise, at least one additional microphone configured to acquire at least one additional audio signal comprising the speech and noise, and a memory configured to store software instructions that, when executed by the at least one processor, cause the digital system to perform a method of dominant speech extraction that includes acquiring a primary audio signal from the primary microphone and at least one additional audio signal from the at least one additional microphone, decomposing each of the acquired audio signals into a low frequency sub-band signal and a high frequency sub-band signal, applying speech suppression beamforming to the low frequency sub-band signals to generate a reference channel having an estimate of a level of noise in the low frequency sub-band signals, applying noise cancellation to the low frequency sub-band signal of the primary audio signal using the reference channel to generate a first signal having a low frequency estimate of the speech, applying noise suppression beamforming to the high frequency sub-band signals to generate a second signal having a high frequency estimate of the speech, and combining the first signal and the second signal to generate a full-band audio signal.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
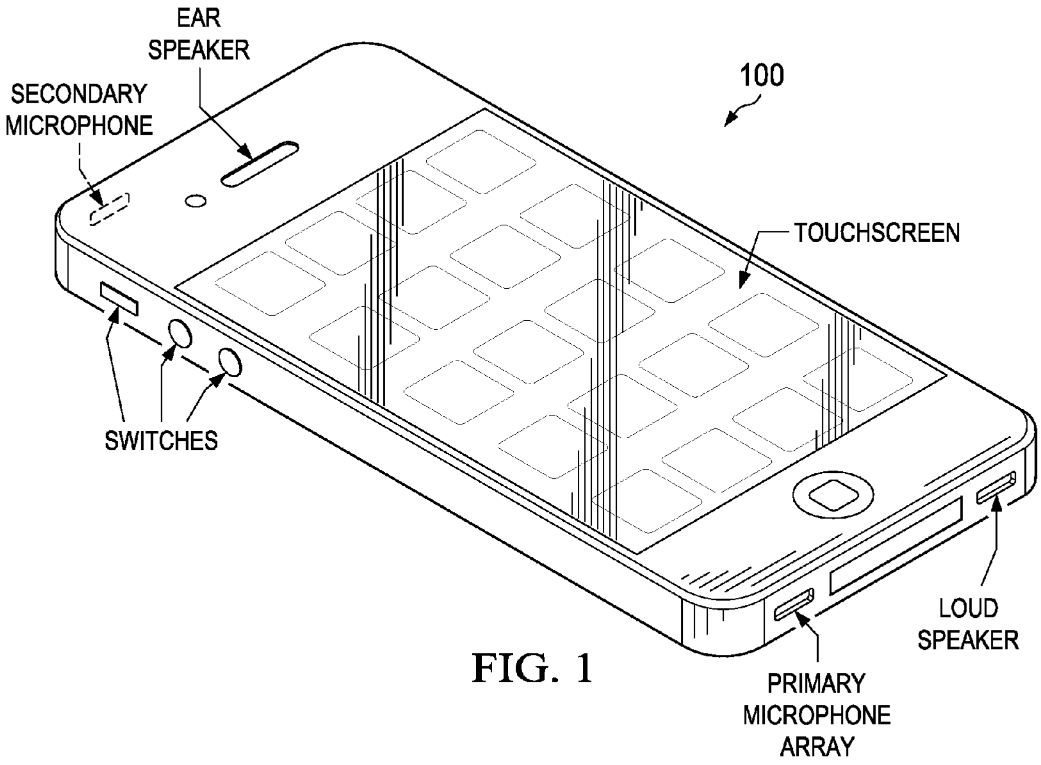
FIG. 1 is a perspective view of a smart phone configured to perform a method for dominant speech extraction in the presence of diffused and directional noises.

Specific embodiments of the invention will now be described in detail with reference to the accompanying figures. Like elements in the various figures are denoted by like reference numerals for consistency.

As previously mentioned, prior art spatial noise cancellation techniques do not intrinsically exploit the spectral nature of audio signals. Embodiments of the invention provide a solution for noise cancellation in a transmitted audio signal that integrates spatial filtering and traditional noise cancellation. More specifically, in some embodiments, both the low frequency directivity of the superdirective beamforming (also referred to as superdirectivity) and the high frequency directivity of the filter-and-sum beamforming are exploited to enable high directivity across a very wide bandwidth. The directional properties of the dominant audio source (speech) are used to improve the signal-to-noise ratio (SNR) of the noise cancellation. Further, the noise cancellation provided in embodiments works well for both diffuse and directional noise sources, whereas filter-and-sum beamforming or super-directivity alone do not perform very well with a diffuse noise field.

Embodiments assume a dominant speech source with a strong direct path and one or more secondary speech sources. More specifically, embodiments rely on speech signals captured by two or more microphones, from which the dominant speech will be extracted. The microphones may be arranged either horizontally in a line or vertically in a line, e.g., mounted above a laptop screen or tablet screen or mounted as the primary voice input source on the lower part of a cell phone or smartphone. Embodiments assume that a user is fairly close to the microphones mounted on a device such that the user's speech has a strong direct path. A deflation type of approach is used in which the interference (noise) is estimated from the signals captured by the microphones and the estimate is used to extract the dominant source (speech). The source of the interfering noise may be, for example, ambient and diffuse sounds such as café, train, and street sounds or directional sounds such as a speaker originating from a different point in space.

Figure 2:
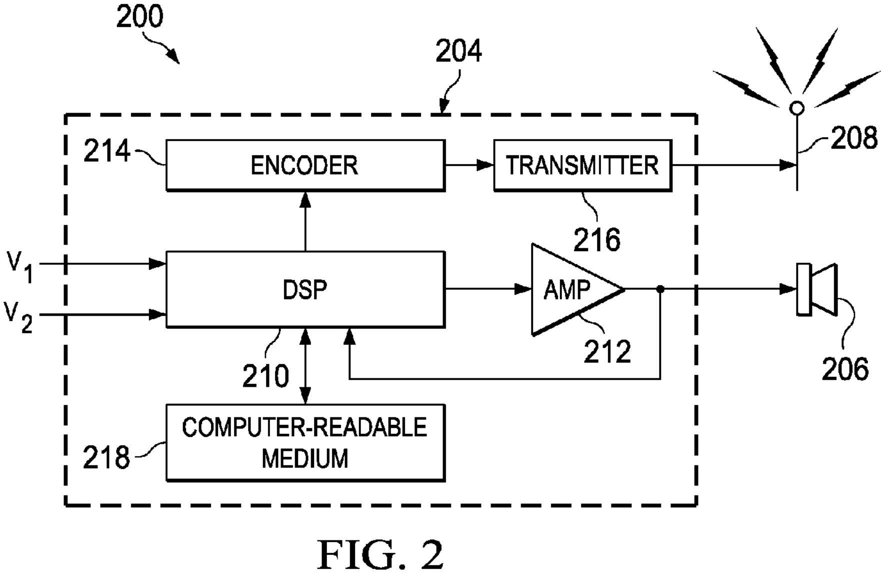
FIG. 2 is a block diagram of the smart phone of FIG. 1.

FIG. 1 is a perspective view of a mobile smartphone 100 that includes an information handling system 200 depicted in FIG. 2. The smartphone 100 is configured to perform an embodiment of a method for dominant speech extraction as described herein. In the example of FIG. 1, the smartphone 100 includes a primary microphone array, a secondary microphone, an ear speaker, and a loud speaker. For simplicity of explanation, embodiments are explained assuming that the primary microphone array includes two microphones that may be arranged horizontally along a line, i.e., side-by-side, or vertically along a line, i.e., one on top of the other. One of ordinary skill in the art will understand embodiments in which the primary microphone array includes more microphones. Also, the smartphone 100 includes a touchscreen and various switches for manually controlling an operation of the smartphone 100.

FIG. 2 is a block diagram of the information handling system 200 of the smartphone 100. A user speaks into the primary microphone array of the smart phone 100, which converts sound waves of the speech into voltage signals $V_1$ and $V_2$. The voltage signals will both contain sound waves of the speech and of noise (e.g., from an ambient environment that surrounds the smartphone 100). A control device 204 receives the signals $V_1$ and $V_2$ from the primary microphone array. In response to the signals $V_1$ and $V_2$, the control device 204 outputs an electrical signal to a speaker 206 and an electrical signal to an antenna 208. The first electrical signal and the second electrical signal communicate speech from the signals $V_1$ and $V_2$, while suppressing at least some of the noise in the signals, i.e., an embodiment of a method for dominant source extraction as described is performed on the signals to extract the speech while suppressing noise.

In response to the received electrical signal, the speaker 206 outputs sound waves, at least some of which are audible to the user. In response to the received electrical signal, the antenna 208 outputs a wireless telecommunication signal (e.g., through a cellular telephone network to other smartphones). The control device 204, the speaker 206, and the antenna 208 are components of the smartphone 100, whose various components are housed integrally with one another. Accordingly, the speaker 206 may be the ear speaker of the smartphone 100 or the loud speaker of the smartphone 100.

The control device 204 includes various electronic circuitry components for performing the control device 204 operations including a digital signal processor (DSP) 210, an amplifier (AMP) 212, an encoder 214, a transmitter 216, and a computer-readable medium 218. The DSP is a computational resource for executing and otherwise processing instructions, and for performing additional operations (e.g., communicating information) in response thereto. The AMP 212 is for outputting the electrical signal to the speaker 206 in response to information from the DSP 210. The encoder 214 is for outputting an encoded bit stream in response to information from the DSP 210. The transmitter 216 is for outputting the electrical signal to the antenna 208 in response to the encoded bit stream. The computer-readable medium 218 (e.g., a nonvolatile memory device) is for storing information.

The DSP 210 receives instructions of computer-readable software programs that are stored on the computer-readable medium 218. In response to such instructions, the DSP 210 executes such programs and performs operations responsive thereto, so that the electrical signals communicate speech from the signals $V_1$ and $V_2$, while suppressing at least some noise in the signals. That is, as least some of the executed instructions cause the execution of an embodiment of a method for dominant speech extraction as described herein. For executing such programs, the DSP 210 processes data, which are stored in memory of the DSP 210 and/or in the computer-readable medium 218.

Figure 3:
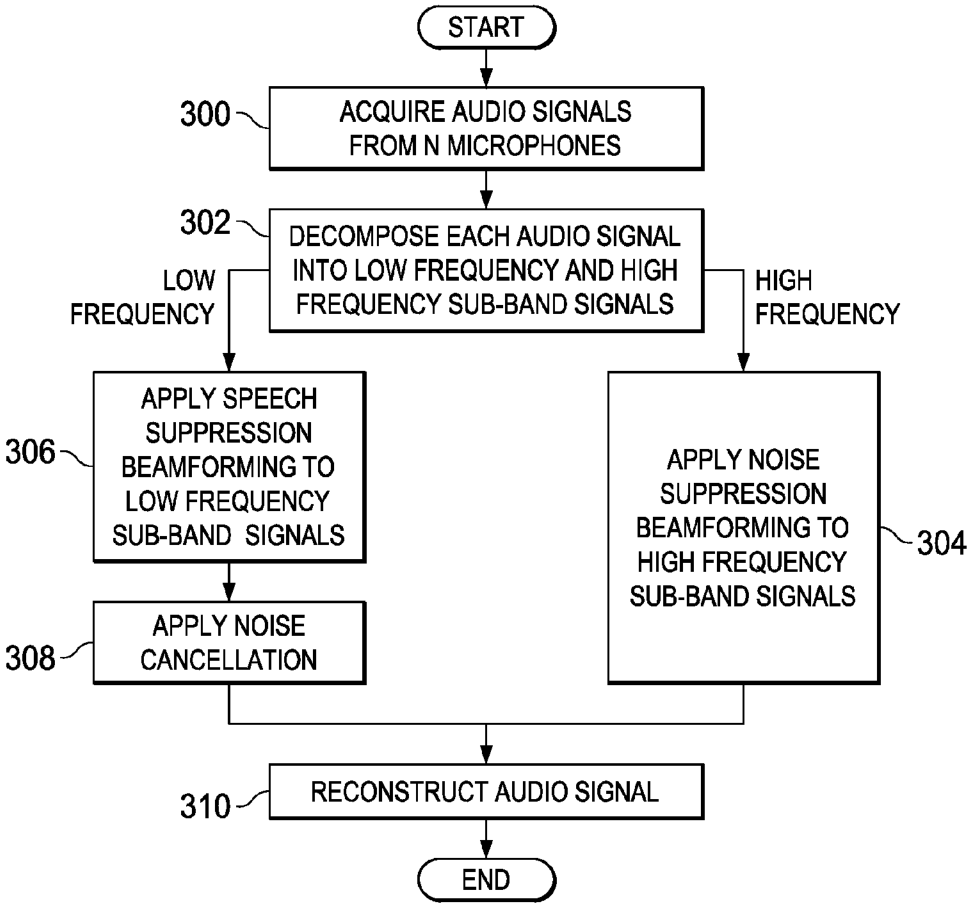
FIG. 3 is a flow diagram of a method for dominant speech extraction in the presence of diffused and directional noises.

FIG. 3 is a flow diagram of a method for dominant speech extraction in the presence of diffused and directional noises that may be performed, for example, by the smartphone of FIG. 1. Initially, audio signals are acquired 300 from N microphones, where N≥2. The N microphones may be arranged either horizontally in a line, i.e., side by side, or vertically in a line, i.e., one on top of another. Further, at least one of the N microphones is placed to provide a primary speech signal from a user. The designation of which of the N microphones is to provide the primary signal is implementation dependent and may depend on the value of N. For example, if N=3 and the microphones are arranged horizontally, the audio signal from the middle microphone may be designated as the primary signal.

Each of the N audio signals is decomposed 302 into a low frequency sub-band signal and a high frequency sub-band signal. Techniques for decomposing an audio signal into a low frequency sub-band signal (channel) and a high frequency sub-band signal (channel) are well-known and any suitable technique may be used to decompose the audio signals. For example, a low-pass filter and a high-pass filter may be applied to decompose each audio signal. In another example, a multi-rate technique such as a perfect reconstruction filter bank may be used. Some suitable multi-rate techniques that may be used are described in P. Vaidyanathan, "Multirate Digital Filters, Filter Banks, Polyphase Networks, and Applications: A Tutorial," Proceedings of the IEEE, Vol. 78, No. 1, January 1990, pp. 56-93 ("Vaidyanathan" herein).

Figure 4:
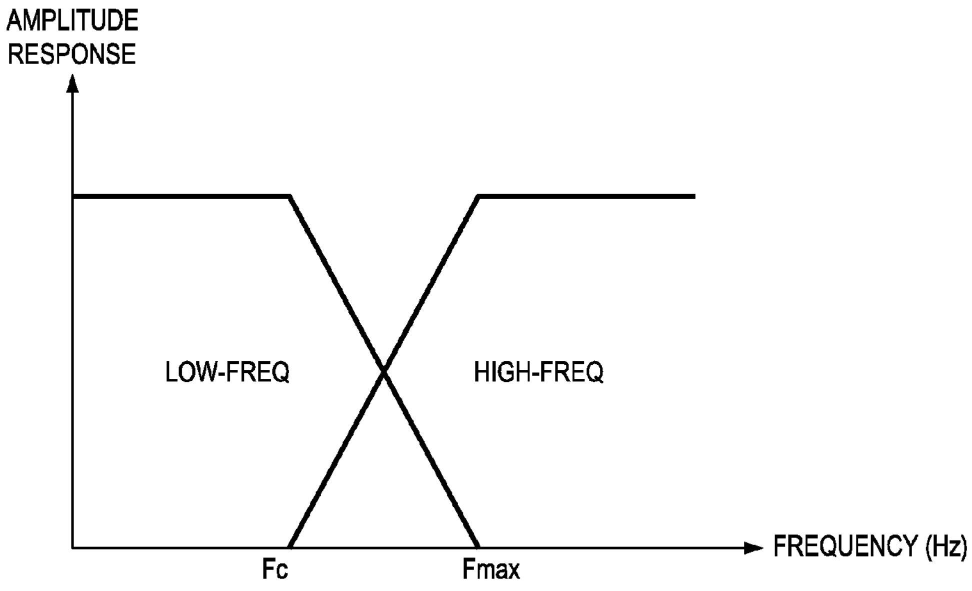
FIG. 4 is an example graph illustrating sub-band decomposition in the frequency domain.

FIG. 4 illustrates the desired sub-band decomposition in the frequency domain. In this figure, Fmax is the bandwidth of the signal and Fc is the cutoff frequency separating the low-frequency and high-frequency band. The choice of Fc is implementation dependent and may depend on the type of noise expected and the dimensions of the target product.

Referring again to FIG. 3, the N low frequency sub-band signals and the N high frequency sub-band signals are then processed separately. The output of processing the N low frequency sub-band signals is a signal containing a low frequency estimate of the dominant source, i.e., the speech. This signal is primarily speech with reduced noise. The output of processing the N high frequency sub-band signals is a signal containing a high frequency estimate of the dominant source (speech) with reduced noise. Although the low frequency component and the high frequency component will each have noise attenuated, the speech in each sub-band is only a fraction of the full spectrum of the dominant speech to be approximated. A good estimation of the dominant source requires reconstructing the signal from each sub-band to a full-band signal The processing of the N low frequency sub-band signals to generate the low frequency estimate is as follows. A speech suppression beamforming algorithm, e.g., a superdirective beamforming algorithm or a delay-and-subtract beamforming algorithm, is applied 306 to the N low frequency sub-band signals to estimate the level of interference (noise). This estimate of the level of noise may be referred to as the reference channel herein.

Any suitable algorithm for superdirective beamforming or delay-and-subtract beamforming may be used. Superdirective beamformer design is described, for example, in S. Doclo and M. Moonen, "Superdirective Beamforming Robust Against Microphone Mismatch," IEEE Transactions on Audio, Speech, and Language Processing, Vol. 15, No. 2, February 2007, p. 617-631. Delay-and-subtract beamformer design is described, for example, in M. Moonen and S. Doclo, "Digital Audio Signal Processing Lecture-2: Microphone Array Processing," Version 2013-2014, pp. 1-40, available at http://homes.esat.kuleuven.be/·dspuser/dasp/material/Slides_2013_2014/Lecture-2.pdf, ("Moonen" herein).

Noise cancellation is then applied 308 to the low-frequency sub-band signal of the primary audio signal using the reference channel. The low-frequency sub-band signal of the primary audio signal may be referred to as the primary channel herein. As part of the noise cancellation, voice activity is estimated in the primary channel using a two channel voice activity detector (VAD) where the inputs are the primary channel and the reference channel. The goal of the VAD to help the noise cancellation algorithm remove noise from speech. The noise cancellation uses the VAD to provide a more accurate estimation of the signal-to-noise ratio in the input, which in turn translates to more accurate noise reduction. Another use of the VAD is to slow noise filter adaptation in the presence of speech to avoid filter divergence. One example of a suitable VAD is described in United States Patent Application Publication No. 2011/0125497, published May 26, 2011, which is incorporated by reference herein.

The noise in the primary channel is canceled based on the reference channel using a suitable two channel noise cancellation algorithm to generate the signal containing the low frequency estimate of the dominant source. One example of a suitable algorithm is described in United States Patent Application Publication No. 2013/0054233, published Feb. 28, 2013, which is incorporated by reference herein. Another example of a suitable two channel noise cancellation algorithm is a Normalized Least-Mean-Square (NLMS) two channel noise cancellation algorithm.

The processing of the N high frequency sub-band signals to generate the high frequency estimate is as follows. A suitable noise suppression beamforming algorithm, e.g., a filter-and-sum beamforming algorithm or a delay-and-sum beamforming algorithm, is applied 304 to the N high frequency sub-band signals to filter out interference and generate the signal containing the high-frequency estimate of the dominant source, i.e., the speech. Filter-and-sum beamformer design and delay-and-sum beamformer design is described, for example, in Moonen.

The audio signal is then reconstructed 310 from the signal containing the low-frequency estimate of the dominant source and the signal containing the high-frequency estimate of the dominant source by combining the two signals. The resulting audio signal is a full-band audio signal with the interference cancelled. Any suitable technique for reconstructing the audio signal from the two channels may be used. For example, the low-frequency sub-band can be added to the high-frequency band to get a full-spectrum reconstructed signal. Also, reconstruction can also be done by applying a suitable multi-rate technique as described in Vaidyanathan.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, while embodiments may have been described herein primarily in reference to smartphones, one of ordinary skill in the art will understand that embodiments of the method may be implemented for virtually any suitably configured digital system that uses voice input. Such digital systems may include, for example, a desk top computer, a laptop computer, a cellular telephone, a personal digital assistant, a speakerphone, a voice activated appliance for the home such as a smart thermostat, an interactive interface for microwaves and refrigerators, voice controlled devices such as TV remote controls, etc.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method of dominant speech extraction in a digital system, the method comprising:

acquiring a primary audio signal from a primary microphone comprised in the digital system and at least one additional audio signal from at least one additional microphone comprised in the digital system, wherein the acquired audio signals comprise speech and noise;

decomposing each of the acquired audio signals into a low frequency sub-band signal and a high frequency sub-band signal;

applying speech suppression beamforming to the low frequency sub-band signals to generate a reference channel comprising an estimate of a level of noise in the low frequency sub-band signals;

applying noise cancellation to the low frequency sub-band signal of the primary audio signal using the reference channel to generate a first signal comprising a low frequency estimate of the speech;

applying noise suppression beamforming to the high frequency sub-band signals to generate a second signal comprising a high frequency estimate of the speech; and combining the first signal and the second signal to generate a full-band audio signal.

2. The method of claim 1, wherein applying speech suppression beamforming comprises applying one selected from a group consisting of superdirective beamforming and delay-and-subtract beamforming.

3. The method of claim 1, wherein applying noise suppression beamforming comprises applying one selected from a group consisting of filter-and-sum beamforming and delay-and-sum beamforming.

4. The method of claim 1, wherein applying noise cancellation comprises performing voice activity detection on the low frequency sub-band signal of the primary audio signal.

5. A digital system comprising:

at least one processor;

a primary microphone configured to acquire a primary audio signal comprising speech and noise;

at least one additional microphone configured to acquire at least one additional audio signal comprising the speech and noise; and a memory configured to store software instructions that, when executed by the at least one processor, cause the digital system to perform a method of dominant speech extraction, the method comprising:

acquiring a primary audio signal from the primary microphone and at least one additional audio signal from the at least one additional microphone;

decomposing each of the acquired audio signals into a low frequency sub-band signal and a high frequency sub-band signal;

applying speech suppression beamforming to the low frequency sub-band signals to generate a reference channel comprising an estimate of a level of noise in the low frequency sub-band signals;

applying noise cancellation to the low frequency sub-band signal of the primary audio signal using the reference channel to generate a first signal comprising a low frequency estimate of the speech;

applying noise suppression beamforming to the high frequency sub-band signals to generate a second signal comprising a high frequency estimate of the speech; and combining the first signal and the second signal to generate a full-band audio signal.

6. The digital system of claim 5, wherein applying speech suppression beamforming comprises applying one selected from a group consisting of superdirective beamforming and delay-and-subtract beamforming.

7. The digital system of claim 5, wherein applying noise suppression beamforming comprises applying one selected from a group consisting of filter-and-sum beamforming and delay-and-sum beamforming.

8. The digital system of claim 5, wherein applying noise cancellation comprises performing voice activity detection on the low frequency sub-band signal of the primary audio signal.

* * * * *